O. C. EVANS.
Steam-Plow.
No. 16,007.
Patented Nov. 4, 1856.
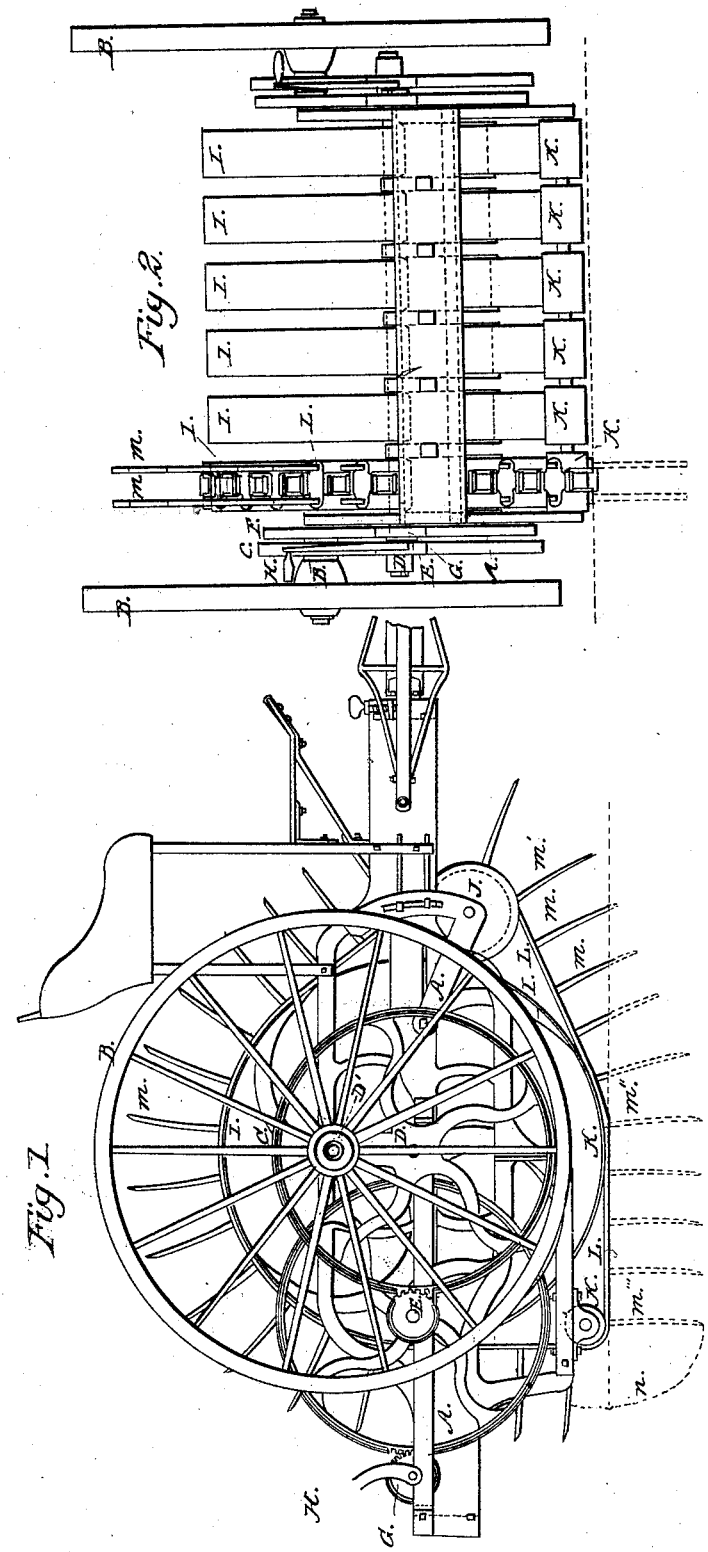

UNITED STATES PATENT OFFICE.

ORMROD C. EVANS, OF STANTOWN, OHIO.

IMPROVEMENT IN SPADING-MACHINES.

Specification forming part of Letters Patent No. 16,067, dated November 4, 1856.

*To all whom it may concern:*

Be it known that I, ORMROD C. EVANS, of Stantown, county of Miama, and State of Ohio, have invented certain new and useful Improvements in Spading or Digging Machines; and I do hereby declare that the following is a full, clear, and exact description of the same, reference being made to the annexed drawings, making a part of this specification, in which—

Figure I is a side view or elevation. Fig. II is a back view or elevation; and similar letters indicate similar parts throughout.

My invention consists of a truck or cart supporting a frame-work in which revolves a series of drums or broad-faced wheels side by side, each carrying an endless belt or chain, and upon which a series of spades or spading-forks are placed. The operation of these is such that as the machine is drawn over the ground each spade is driven into the ground gradually and in successive order, and so as simply to pierce the same without breaking in the first instance. The upheaval or turning of the sod or earth is performed only at the time of leaving the ground. By means of this peculiarity not only a great surface and depth may be dug over in a short time, but that may be accomplished at a moderate expenditure of power.

Fig. I represents a side view or elevation of the machine.

At A is one side of a strong frame, open in the interior, being hung upon two truck-wheels, B, suspended from the outside upon short axles, but in such way as to permit the raising and lowering of A together with its series of drums and spades attached thereto. For this purpose the short axles B' or the truck-wheels are each affixed upon one of the spokes of a wheel, C, which is centered at D upon the main frame A in the line of the axes of the drums I, hereinafter to be described. This wheel is toothed or cogged on its edge, and is connected by a train, E F G, of similar wheels to the handle H, whereby it can be made to rotate. The length of the spoke from D to B' is such that when B' is at its highest point the truck-wheels will be lifted entirely clear of the ground, and when at its lowest point in the revolution of C the axis B' will be so far below D as to have raised the drums I with the spades upon them in like manner off the ground, whereby the wheels B can then be used for the purpose for which they are provided—viz., that of transporting the machine from place to place when not spading. When the wheel C is in the desired position it is secured there by a pawl taking into G, or by any method of fastening the handle H. This raising and lowering of the drums within the frame may be effected in any suitable manner instead of that I have described, as I am aware that these may be advantageously varied in accordance with the size and weight of the machine.

At I is represented one of the spade drum-wheels, and in each machine several such may be placed side by side within the frame A.

At J and K are two rollers for each drum, and placed in the frame respectively as shown. The endless chain L, holding the spades or spading-forks, passes over the drum I and over these rollers in the manner represented, the spades being shown by the letter $m$. The roller J is placed in the fore part of the machine, and is suspended above the ground at a height a little greater than the length of a spade-tooth. The lower surface of the drum I rests upon the ground, as does also the roller K. It will now be seen that from the roller J' to the lower surface of the drum the spade chain forms an angle with the ground, while from the drum-wheel K it passes parallel thereto.

It has been remarked that the spades enter the ground by a gradual pressure, and also by a direct thrust, even although the machine is all the time in a state of progressive motion. To accomplish this the teeth are curved with a certain curve having a radius from near the point of contact of the drum I with the ground, as at X, extending to the surface of the pulley J, and it is a distinguishing feature of my machine that each spade remains stationary, or nearly so, in the spot it is to operate upon until it has performed its work, the machine rolling over them. Thus as in the progress of the machine the spades are brought round by the revolution of the drum I a spade will come into position, as at $m'$, the moment it has passed the underside of J. Here it remains stationary, while as the machine advances, the drum I, rolling upon the endless chain, forces the portions between X and J toward the ground, so that when the drum arrives over $m'$ that spade will have been inserted to its full depth, in the manner as shown at $m''$. In fact that portion of the chain L which is upon the ground in a level position forms a roadway or track for the drums. When, however, the small roller K arrives over the spade $m''$, now supposed to be in the position of $m'''$, and which roller also travels, as it were, along the endless chain as a roadway, the point of contact where the chain takes a turn upward will describe a portion of a cycloid, and the spade $m'''$ will be thereby transferred from the vertical position to a horizontal one, turning at that time upon the axis of K as a center, and thus by necessity upheaving the earth as the spades or forks cannot be released therefrom without doing so. The operation of one being described, that of all the other drums would be a mere repetition.

It may not always be desirable that the spades or forks should be curved in the precise manner hereinbefore described, and if made nearly or quite straight they will in some earths penetrate as well, and will then only be required to move a little more through the ground in a forward direction as the machine progresses; but this will be only until they shall have become fully inserted.

When hard or stony soils are to be operated upon the mere tension of the chain L between the drum I and the point of contact with the ground will not probably render it sufficiently stiff to drive the spades entirely in, and a plate of metal of proper strength may be affixed to the machine in such position that the upper or back side of the chains at this place shall slide upon it, thus preventing the chain from yielding. The chain itself, however, can be so constructed as to turn or yield only in one direction—viz., in that of passing over the drums.

The operation will be as follows: The machine having been brought into the field to be dug up, the spades are to be brought into contact with the ground by lowering the frame or truck A, and raising up the wheels B by turning the winch H, as before described. The machine will then be in the position shown in the figures. All the teeth or spades from $m''$ to $m'''$ are fully driven in the ground, the chain or band L, to which they are attached, being held firmly in that position. The driver now starts his team and the carriage will be drawn along the drums, bearing upon the chain L as a roadway, and if that part between X and the roller J were rigid it would ascend an incline plane. The ground, however, being yielding, and the spade-teeth too pointed to afford a base for support, they are necessarily driven into the ground by the weight of the carriage intending to ascend said incline plane, which is perpetually maintained by the construction of the machine.

The roller J may be of any convenient size; but it is important that K be made as small as possible for strength and ease of working, for it is by the size of this roller that the degree of angle is obtained at which the forks or spade-blades are lifted out of the ground, the design being to have them rise out as nearly parallel to the surface as possible. Now, as a point in the circumference of the roller K traced out describes a cycloid, the point of the spade-tooth actually describes a portion of a curtate cycloid, as shown in dotted lines at $n$, Fig. 1, in the revolution of one-fourth of the roller K, and hence leaves the ground at a very small angle. The tooth $m'''$ therefore moves from a vertical to a nearly horizontal position while in the ground, and necessarily causes an upheaval of the same to the full depth at which the spade was inserted.

I claim—

The combination of a series of forks or spade-blades with an endless chain, and with a drum and rollers arranged in such order upon a carriage that by the progressive onward motion of the machine the said spades or forks will at first be forced by a direct, or nearly direct, thrust into the ground, and afterward in the act of being lifted by the chain out of the ground shall be made to turn at such short angle with the surface as will cause the breaking and upheaval of the ground, substantially as described.

O. C. EVANS.

Witnesses:
I. P. PINSSOR,
S. H. MAYNARD.